June 4, 1957  J. P. CHAYKA  2,794,541
WORK HOLDER MECHANISM
Filed Jan. 3, 1956  3 Sheets-Sheet 1
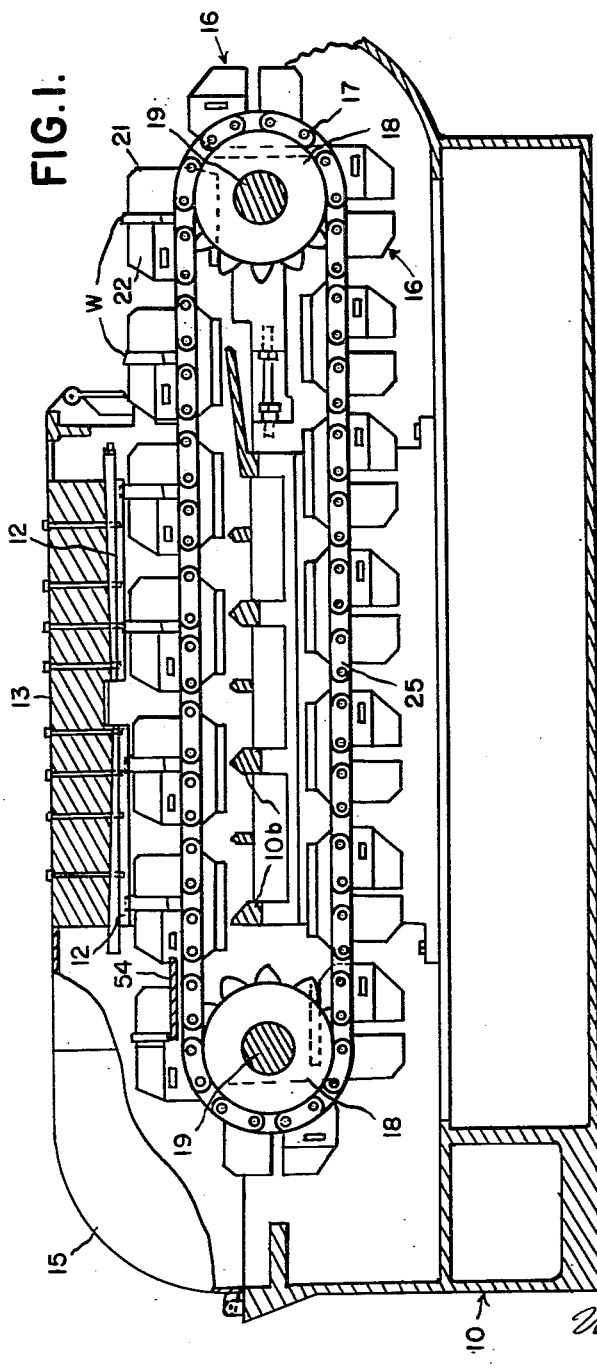
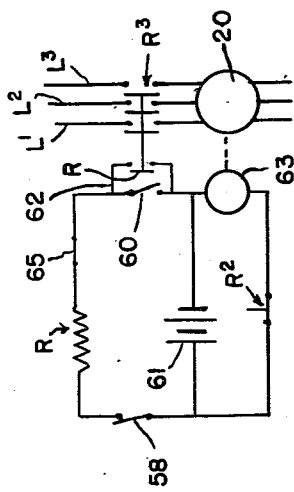
INVENTOR.
JOSEPH P. CHAYKA
BY
*Whittemore, Hulbert & Belknap*
ATTORNEYS June 4, 1957  J. P. CHAYKA  2,794,541
WORK HOLDER MECHANISM
Filed Jan. 3, 1956  3 Sheets-Sheet 2

INVENTOR.
JOSEPH P. CHAYKA
BY Whittemore, Hulbert & Belknap
ATTORNEYS

June 4, 1957  J. P. CHAYKA  2,794,541
WORK HOLDER MECHANISM
Filed Jan. 3, 1956  3 Sheets-Sheet 3

INVENTOR.
JOSEPH P. CHAYKA
BY
ATTORNEY

United States Patent Office 2,794,541
Patented June 4, 1957

2,794,541

WORK HOLDER MECHANISM

Joseph P. Chayka, Ferndale, Mich., assignor to Detroit Broach Company, Inc., Rochester, Mich., a corporation of Michigan Application January 3, 1956, Serial No. 557,007

3 Claims. (Cl. 198—232)

This invention relates to work holder mechanism and refers more particularly to such mechanism in which the work is automatically clamped as the holder moves along a predetermined path.

One object of this invention is to provide a work holder mechanism having a safety device which is operative to stop the movement of the holder along its path in the event of failure of the clamp actuating mechanism.

Another object of the invention is to provide a work holder having a clamping device thereon and a member carried by the holder and shiftable transversely of the path of movement of the holder from an outer inoperative position inwardly to an operative position to actuate the clamping device. A hammer cam is provided to shift the member as aforesaid, and safety means positioned beyond the hammer cam are adapted to be engaged and operated by the member when it is positioned outwardly of its operative position to stop the conveyor movement. Thus, unless the shiftable member is moved to its operative position to clamp the device, the conveyor is stopped.

Other objects of the invention will become apparent as the following description proceeds, especially when considered with the accompanying drawings, wherein:

Figure 1 is a side elevational view partly in section of a machine embodying the features of the present invention.

Figure 4 illustrates a wiring diagram.

Figure 2:
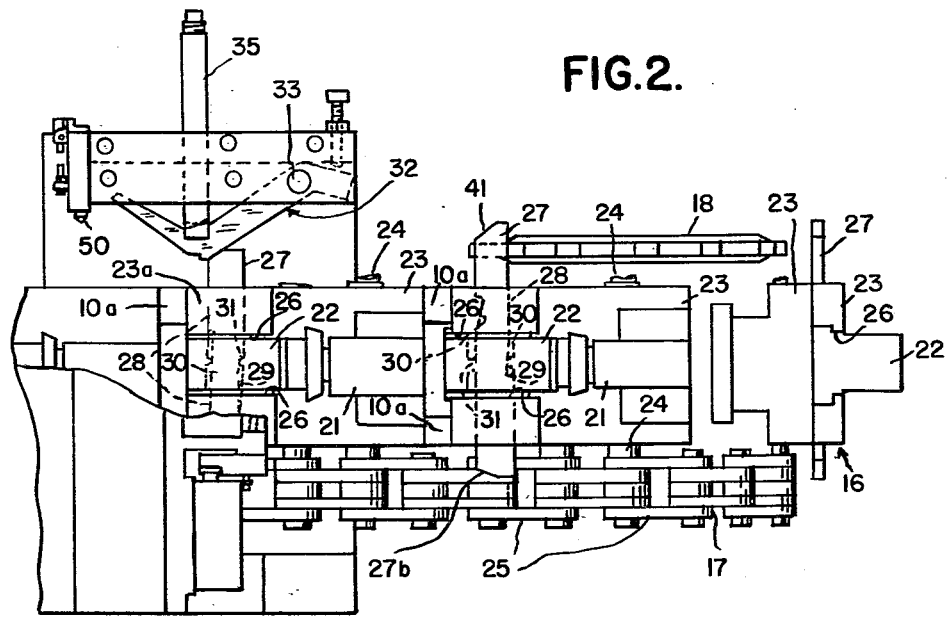
Figure 2 is a fragmentary plan view of a portion of the machine shown in Figure 1.

Referring now more particularly to the drawings, the invention is shown as applied to a continuous broaching machine which is best seen in Figure 1. The machine includes a frame 10. Sectional broaches 12 are carried by a bridge 13 mounted on the frame or bed intermediate its ends and constitute in effect a top wall of a tunnel through which successive work pieces are passed. Sheet metal covers or housings 15 are provided to enclose the end portions of the machine.

Work pieces, such as indicated at W, are received in a series of work holders designated generally by the reference character 16 and are carried by the latter beneath the broaches 12 so that the broaches shear the top and or side surfaces of the work pieces. The work holders 16 are mounted between a pair of endless chains 17 trained over sprockets 18 carried on shafts 19 journaled in opposite ends of bed 10. One of the shafts 19 is driven by a suitable electric motor indicated at 20 in Figure 4.

In the normal operation of the machine, the work holders 16 are advanced continuously through their endless path. The operator places the work pieces W in successive ones of the holders at the righthand or entrance end of the machine as viewed in Figure 1. As the holders approach the tunnel in which the broaches 12 are located, suitable clamping devices on each of the holders are automatically actuated into clamped position. As the holders emerge from the tunnel, their clamping devices are automatically unclamped and the finished work piece may be removed.

Each work holder 16 includes a clamping device comprising a fixed jaw 21 and a movable jaw 22. Each fixed jaw 21 is rigid with a base plate 23 having pins 24 protruding laterally therefrom and on which are journaled appropriate ones of the links 25 which make up the endless chains 17. The movable jaws 22 are fashioned in the form of blocks received in longitudinally extended guides 26 on the upstanding forward portions 23a of the base plates 23. Guides 10a are in the form of elongated flat plates carried by suitable transverse webbing 10b in the bed 10 to slidably support the base plates 23 in the course of their travel beneath the broaches.

Each movable jaw 22 is equipped with a coacting bar 27 which is movable endwise to cam the movable jaw 22 into and out of clamping position. Such actuator bars 27 are slidable endwise in aligned transverse holes 28 in the upstanding portions 23a of the base and also pass through generally centrally located apertures 29 in the movable jaws 22. The leading and trailing edges of the bars 27 are relieved to form sloping surfaces 30 arranged to coact with complementary shaped protrusions 31 on the inner side walls of the apertures 29 in the movable jaws. The slope of the surfaces 30 is such that upon an endwise movement of one of the actuator bars from an outer inoperative position inwardly to an operative position, that is downwardly as viewed in Figure 2, the cooperating jaw 22 is cammed into clamping position against the work piece W whereas upon movement of the actuator bar in the opposite direction the movable jaw is withdrawn into unclamped position. A hammer cam 32 is employed for driving successive ones of the actuator bars 27 endwise in a direction to effect clamping of the work. In the present instance, the hammer cam 32 is fashioned in the form of an elongated arm pivoted on a pin 33 alongside of the path of travel of the work holders to swing toward and away from the latter. A spring 34 yieldably edges the hammer cam into position to intercept successive ones of the actuator bars 27. As pointed out above, the guides 10a provide a positive support for the work holders as they move along the top run of the conveyor so that each actuator bar 27 moves along a predetermined path to be intercepted by the positioned hammer cam. The spring 34 is a helical compression spring located in a tubular housing 35 having one end bearing against an adjusting plug 36 threaded in the outer end of the housing. A hollow plunger 37 is slidably received in the inner end of the housing against which the other end of the spring bears. The lower end of this plunger has a recess 38 and the base of the recess bears against the hammer cam 32 and thus edges the latter to swing toward the work holder with a force which may be varied by threading the adjusting plug 36 in or out. An adjustable stop 39 limits the swing of the hammer cam 32 inwardly toward the work holder. The stop 39 is in the form of a screw which is threadedly supported in a fixed frame member 40 for axial adjustment thereby to vary the inner limit of the hammer cam.

Figure 3:
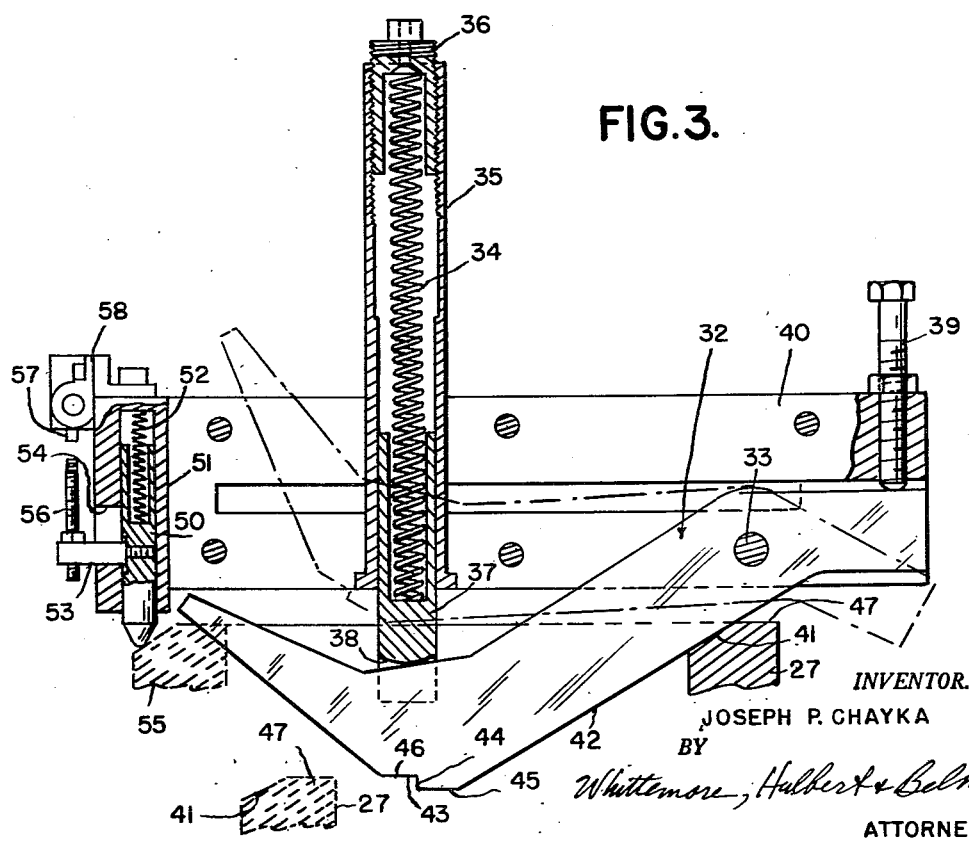
Figure 3 is an enlarged fragmentary detail showing a portion of Figure 2, partly in section.
Figure 5:
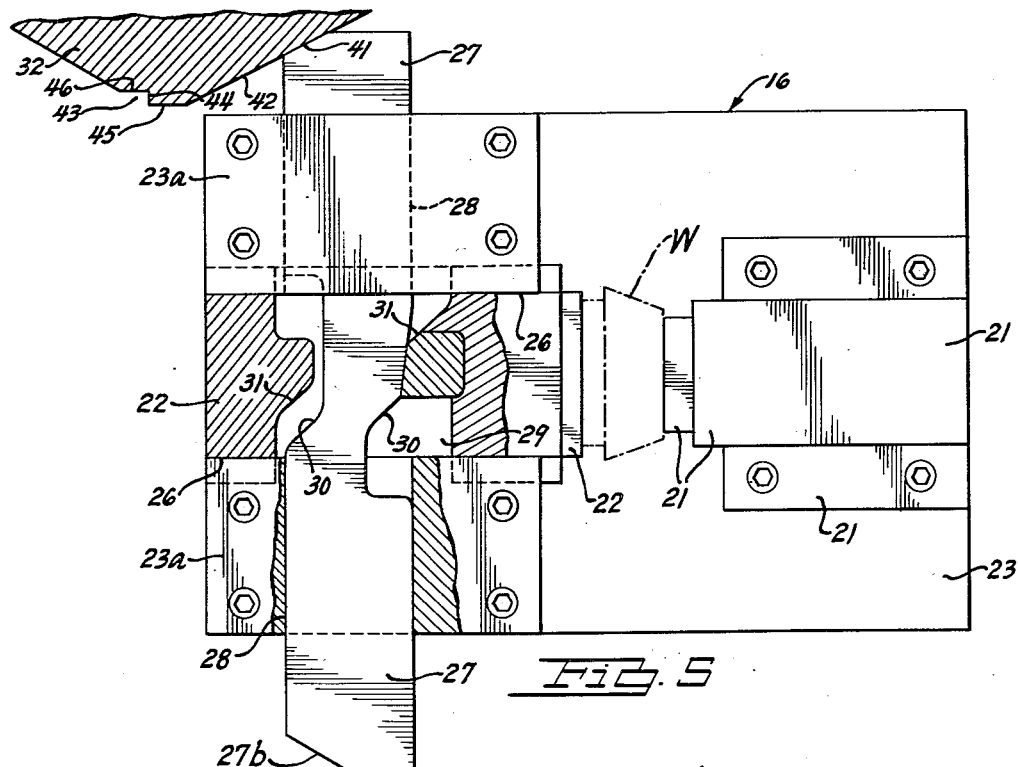
Figure 5 is a top plan view of one of the work holders preferably employed, certain portions being broken away to clearly show the construction of the work clamping mechanism.
Figure 6:
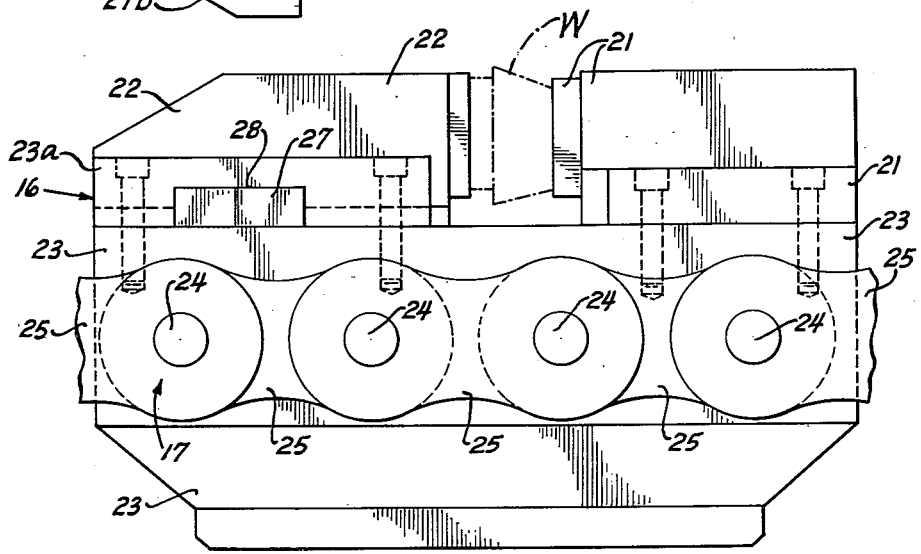
Fig. 6 is a side elevational view of the work holder shown in Fig. 5 indicating the endless chain on which it is mounted.

The ends of the actuator bars 27 are sloped rearwardly as indicated at 41 complementary to the slope of the leading edge 42 of the hammer cam when it occupies its unstressed position indicated in solid lines in Figure 3. It will also be seen that the hammer cam beyond the edge 42 is provided with a recessed portion 43 providing an abrupt shoulder 44 which extends transversely of the path of conveyor travel and connects with the leading edge 42 by an edge 45 at right angles to the shoulder 44.

As each successive actuator bar comes into contact with the hammer cam 32, its end portion 41 slides progressively along the edge 42 of the hammer cam, thrusting the latter outwardly from the solid line position shown in Figure 3 and compressing the spring 34 to thereby cock or load the hammer cam mechanism. The hammer cam is shown in Figure 2 in partially cocked position. During such outward swing of the hammer cam, the bar 27 is thrust inwardly but not sufficiently to fully complete the clamping of the work. As the bar 27 continues to move forward or to the left, the surface 45 of the hammer cam rides over the end of the bar and finally drops off beyond the shoulder 44. As an incident to such dropoff, the compressed spring 34 drives the hammer cam 32 against the end of the actuator bar causing a sharp blow to be delivered to the latter. Specifically, the surface 46 of recess 43 which is at right angles to the surface 44, strikes the end surface 47 of the actuator bar 27, thus driving the latter endwise still further in an inward direction to complete the camming of the cooperating movable clamp jaw 22 into clamping position.

In the event that one of the actuator bars 27 should stick or for any reason offer more than normal resistance to movement inwardly it would, without else, simply shoulder the hammer cam 32 aside a greater distance than normal and continue on without clamping the work. In accordance with the present invention, provision is made for automatically arresting further motion of the work holder 16 in the event of such improper operation. For that purpose, a plunger 50 is arranged to slide endwise within a housing 51 beyond the hammer cam. A compression spring 52 is located within the housing 51 being compressed between the outer end thereof and the adjacent hollow end portion of the plunger 50. A pin 53 is secured to the plunger 50 and extends laterally outwardly therefrom through an elongated slot 54 in the side of housing 51. The slot is long and narrow determining the stroke of the plunger and closely confining the pin laterally to prevent rotation of the plunger and pin. The lower end of the slot, as viewed in Figure 3, determines the limit of inward movement of the plunger. In the normal inward limiting position of the plunger, it remains clear of the actuator bar 27, assuming the latter is properly shifted to clamping position by the hammer cam. However, in the event that the actuator bar 27 fails to shift inwardly, it will merely shoulder past the hammer cam and cause the latter to swing outwardly to the dotted line position of Figure 3. The actuator bar 27 will continue to move forward to the position indicated at 55. The plunger 50 is in the path of the actuator bar when the latter is located in the outer position shown at 55 so that continued forward movement of the work holder will cause the actuator bar 27 in the position shown at 55 to engage the plunger 50. The inner end of the plunger 50 is of reduced conical shape and will be seen to engage the tapered leading edge 41 of the actuator bar so that the plunger is merely cammed outwardly by the actuator bar. It will be noted that the pin 53 carries an elongated element 56 which has a threaded engagement with the pin for axial adjustment thereof. The element extends parallel to plunger 50 and is adapted to engage an actuator button 57 of a switch 58. The opening of the switch 58 serves to stop the drive motor 20. If, for any reason, it becomes desirable to adjust the element 56 for actuating the switch 58, this can be readily accomplished by reason of the threaded connection between the element and pin 53.

Referring to the wiring diagram of Figure 4, it will be seen that the motor 20 is connected across the 3-phase supply lines $L^1$, $L^2$ and $L^3$. The supply lines are shown open by reason of the open position of the contactors $R^3$. In order to start the motor 20 to drive the conveyor work holders around their closed circuit, the switch 60 is momentarily closed to energize the relay R by closing the circuit through the battery 61. As a result, the normally open contactor $R^1$ of relay R is closed to complete a holding circuit through the line 62. Thus, the normally open switch 60 may be released without destroying the circuit through the relay. Closing of the normally open contact $R^1$ also closes the circuit of the supply lines $L^1$, $L^2$ and $L^3$ through the motor by reason of the connection between contact $R^1$ and contact $R^3$. An electrically operated brake 63 is provided for the motor 20 which, however, is deenergized since the normally closed contact $R^2$ of the relay is open when the latter becomes energized. The normally closed switch 58 is opened when the actuator button 57 is depressed by the element 56 upon outward retraction of the plunger 50 to de-energize the relay. De-energization of the relay immediately opens the electric supply lines to the motor, and the normally closed contactor $R^2$ closes to energize the brake 63 which provides an effective means for immediately stopping the motor 20, and, hence, the forward progress of the work holders is also immediately arrested. A stop switch 65 is also provided which may be manually operated to stop the machine. This switch is normally urged to closed position.

A stationary cam 54 is provided at the exit end of the tunnel which abuts against successive ones of the actuator bars 27 and restores them to their initial or unclamped position. The work pieces are thus freed from successive holders as they emerge from the broach. The cam 54 is located on the side of the machine opposite the hammer cam and may be in the form of a simple fixed block presenting a face inclined in the direction of bar travel and complemental to the adjacent inclined ends 27b on the bars 27.

Under some circumstances, it might be desirable to shut down the machine if the actuator bar were cammed by the arm 32 to an intermediate position between the fully clamped position of Figure 3 and the position indicated at 55. This could be accomplished by merely substituting a longer plunger 50.

What I claim as my invention is:

1. In a machine tool, the combination of a work holder having a clamping device thereon, means for moving said holder along a predetermined path of travel, a member movable with said holder along said path and shiftable from an inoperative position to an operative position to actuate said device, means located along said path and normally operable upon said member to shift the latter from inoperative to operative position to actuate said device as said holder moves along its path, and safety means located along said path beyond said second-mentioned means and operated by said member when it is positioned toward said inoperative position from said operative position to stop said first-mentioned means, thereby to stop said holder in the event that said member fails to shift to its operative position by the action of said second-mentioned means.

2. In a machine tool, the combination of a work holder having a clamping device thereon, means for moving said holder along a predetermined path of travel, a member carried by said holder and shiftable transversely of said path from an outer inoperative position inwardly to an operative position to actuate said device, means located along said path and engageable with and normally operable upon said member to shift the latter from inoperative to operative position to actuate said device as said holder moves along its path, and safety means located along said path beyond said second-mentioned means and engaged and operated by said member when it is positioned outwardly of said operative position to stop said first-mentioned means, thereby to stop said holder in the event that said member fails to shift to its operative position by the action of said second-mentioned means.

3. In a machine tool, the combination of a work holder having a clamping device thereon, means for moving said holder along a predetermined path of travel, a member carried by said holder and shiftable transversely of said path from an outer inoperative position inwardly to an operative position to actuate said device, a hammer cam located along said path in position to intercept said member, means for yieldably retaining said hammer cam in a position in which said member rides over it as the member passes, said yieldable means being strong enough to overcome normal resistance to shift of said member and thereby effect a shift of the latter to operative position to actuate said clamping device, and safety means located along said path beyond said hammer cam and operated by said member when it is positioned outwardly of said operative position to stop said first-mentioned means, thereby to stop said holder in the event that said member fails to shift to its operative position by the action of said hammer cam.

No references cited.